July 1, 1969 R. J. WOLFORD 3,453,608

MAGNETIC MEMORY APPARATUS

Filed June 21, 1966

INVENTOR.
RONALD J. WOLFORD
BY
Braddock + Burd
ATTORNEYS

United States Patent Office 3,453,608
Patented July 1, 1969

3,453,608
MAGNETIC MEMORY APPARATUS

Ronald J. Wolford, Hopkins, Minn., assignor to Fabri-Tek Incorporated, Edina, Minn., a corporation of Wisconsin Filed June 21, 1966, Ser. No. 559,286
Int. Cl. G11b 5/12
U.S. Cl. 340—174 9 Claims

ABSTRACT OF THE DISCLOSURE

Improved magnetic film memory apparatus having a drive line laminate with word lines on one surface and drive lines on another surface mounted or adhered to a reinforcing plate having a pair of transverse slots, such that one surface of the laminate is adjacent the plate on one side thereof and portions of the laminate extend through the slots and are mounted to the other side of the reinforcing plate such that the drive lines on both sides of the laminate are available for connection.

This invention is concerned with magnetic memory apparatus and more particularly with an improved structure and method for preparing magnetic drive line apparatus.

Magnetic film memories are now well known in the art. A film memory package generally comprises an array of magnetic film bits deposited on a substrate. Drive lines, comprising word lines and digit lines, are located closely adjacent to the substrate, on each side thereof, so that the substrate is sandwiched between laminated overlays on which the word lines and digit lines are etched. That is, there are both digit and word lines on moth sides of the glass substrate.

The drive line laminates are generally placed on a reinforcing plate prior to being mounted adjacent the film bits on the substrate. This provides a problem when assembling the two drive line overlays which surround the substrate. It is necessary to get the drive line terminations which are adjacent the reinforcing plate to a position where connections such as solder connections can be made to them. In prior art apparatus this has been done with plated-through holes. However, such holes have a history of unreliability, and introduce other disadvantages which make their use undesirable.

It is therefore the primary purpose of the apparatus of this invention to provide an easy and efficient means and method for mounting drive line laminates to the reinforcing plate such that the word lines and drive lines, on opposite sides of the laminate, are all available for connection.

Briefly described, the apparatus of this invention comprises a reinforcing plate having a pair of transverse slots formed therein in spaced relation. A drive line laminate, having word lines on one surface and drive lines on another surface, is mounted or adhered to the plate such that, for example, the drive line surface is adjacent to the plate. Tabs are formed in the laminate which are then extended through the slots and the laminate tabs are mounted to the plate with the word line surface adjacent the plate. Thus a 180° turn is given to the circuitry on the laminate so that the drive lines are available on the outside for connection. Further tabs are provided for folding over the edges of the plate without slots, to provide connections to the word lines.

None of the various figures of the drawings are interrelated as to scale.

Figure 1:
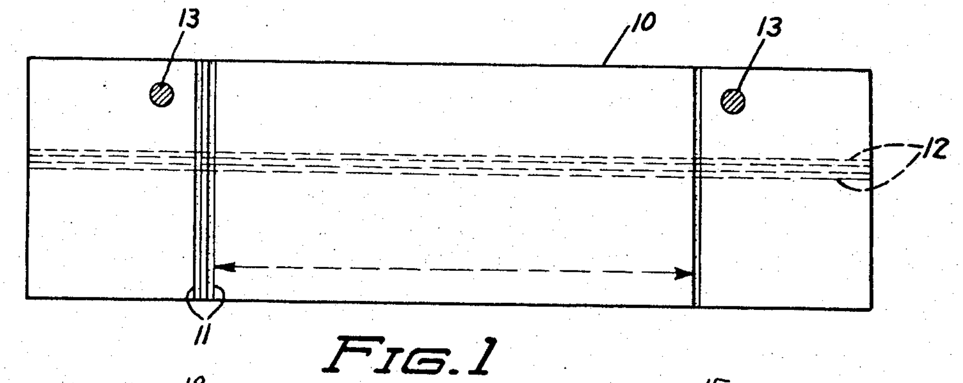
FIG. 1 is a plan view of one surface of a drive line laminate which can be used with the apparatus of this invention.

In FIG. 1 there is shown a drive line laminate 10, having a first surface on which are etched a plurality of drive lines 11, such as word lines, and a second surface on which are etched a plurality of drive lines 12, such as digit lines. Laminate 10 may also be provided with a plurality of registration holes such as holes 13.

Figure 2:
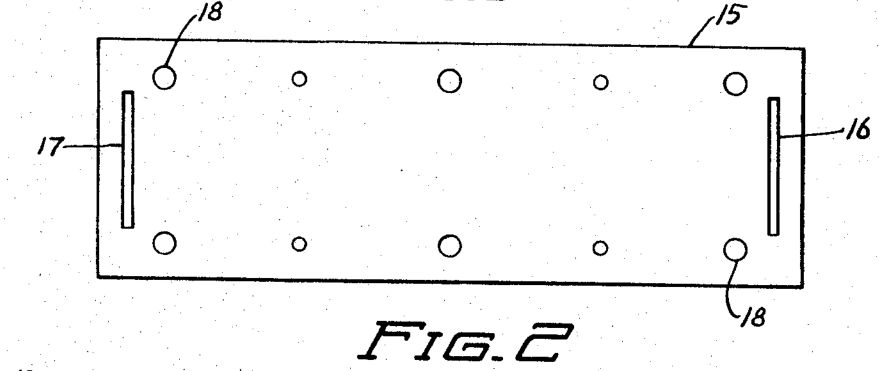
FIG. 2 is a plan view of a slotted reinforcing plate used in an embodiment of this invention.

FIG. 2 discloses a reinforcing plate 15, including a pair of spaced slots 16 and 17. Plate 15 may also include a plurality of registration holes such as 18.

Figure 3:
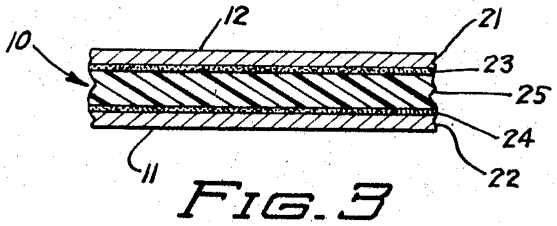
FIG. 3 is a sectional side view of a portion of the laminate of FIG. 1.

FIG. 3 discloses that laminate 10 can, for example, comprise a five-layer laminate including a pair of outside copper layers 21 and 22, a pair of adhesive layers 23 and 24, and an inner insulation layer 25. Drive lines 12 are etched in layer 21, while drive lines 11 are etched in layer 22.

Figure 4:
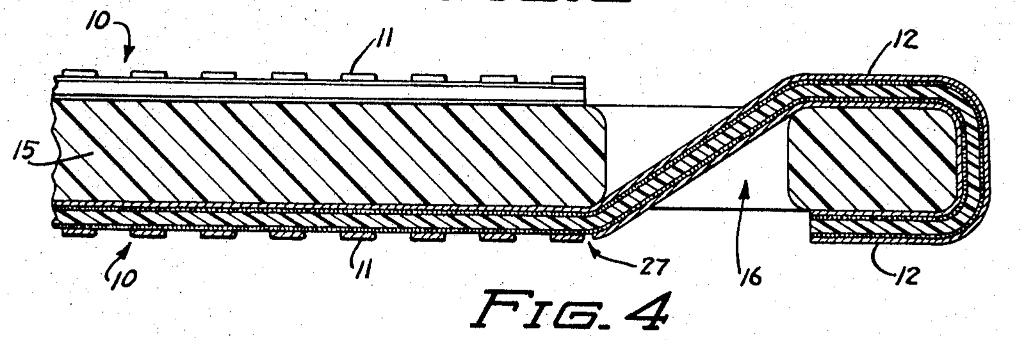
FIG. 4 is a sectional side view showing the laminate of FIG. 1 mounted on the reinforcing plate of FIG. 2.

Reference to FIG. 4, in combination with the other figures of the drawings, discloses the inventive structure and method of this invention. Laminate 10 first has a portion of its surface 21 bearing drive lines 12 adhered to plate 15. Registration holes 13 and 18 can be used for proper alignment of laminate 10 on plate 15. Tabs are then cut in laminate 10 to provide portions of the laminate capable of extending through slots 16 and 17. The tabs are then extended through the slots and the surface 22 of laminate 10 bearing drive lines 11 is adhered to the reinforcing plate. Thus, though drive lines 12 were originally unavailable for connection because they were adhered directly to the reinforcing plate, the 180° inversion of the tab portions passing through slot 16 makes drive lines 12 available on the outside for connections, such as solder connections. In the preferred embodiment, laminate 10 is folded completely around the edge of plate 15, as shown in FIG. 4, for better mounting of laminate 10 to plate 15. Also as shown in FIG. 4, in the preferred embodiment further tabs are folded directly over the other edges of plate 15 to make drive lines 11 available on the other side of plate 15, and also to create better mounting of laminate 10 to plate 15. The width of layer 21 bearing drive lines 12 is preferably such that it does not extend around plate 15 with the further tabs.

Referring again to FIG. 4, it is seen that a schism 27 is provided in the surface of laminate 10 bearing drive lines 11. Schism 27, in the preferred embodiment, separates the etched drive lines 11 from the portion of copper layer 22 which extends through slot 16 to be adhered to plate 15.

It is apparent that the above described invention provides novel, low cost, efficient drive line apparatus. It is important to note that the embodiment shown in the figures and described above is the preferred embodiment, but that other configurations can be used without departing from the spirit and scope of the invention.

The embodiments of the invention in which an exclusive property or privilege is claimed are defined as follows:

1. In magnetic film memory apparatus in which drive lines are mounted adjacent a plurality of magnetic storage elements on a substrate, the improved drive line apparatus comprising:

a reinforcing plate having at least an aperture formed therein;

a drive line laminate including a first surface having a first plurality of drive lines and a second surface having a second plurality of drive lines;

a portion of said laminate mounted on said plate with said first surface adjacent said plate; and at least a further portion of said laminate extending through the aperture in said plate and mounted on said plate wtih said second surface adjacent said plate.

2. The improved drive line apparatus of claim 1 including:

at least another portion of said laminate folded over an edge of said plate and mounted on said plate with said first surface adjacent said plate.

3. The improved drive line apparatus of claim 1 including:

schisms in said second surface of said laminate separating said further portion second surface from said portion second surface.

4. Magnetic memory apparatus comprising:

a drive line laminate including a first outside surface having a plurality of word lines and a second outside surface having a plurality of digit lines, the word lines being transverse to the digit lines;

a reinforcing plate having first and second sides and having formed therein a pair of slots in spaced relation, said slots extending between said first and second sides;

means mounting a first portion of said laminate to said first side of said plate, said second surface being adjacent said first side;

second portions of said laminate extending through said slots;

means mounting said extending second portions of said laminate to said plate, said first surface being adjacent said plate;

third portions of said laminate being folded over first and second edges of said plate; and means mounting said folded third portions to said plate, said second surface being adjacent said second side.

5. The apparatus of claim 4 including:

said extending second portions folded over third and fourth edges of said plate; and means mounting said extending portions to said plate, said first surface being adjacent said first and second sides.

6. The apparatus of claim 4 including:

schisms in said laminate separating said first surface of said second portions from said first surface of said first portion.

7. In magnetic memory apparatus in which drive lines are mounted adjacent a plurality of magnetic storage elements on a substrate, the drive lines comprising at least an overlay laminate having drive lines on first and second surfaces, the method of providing a reinforced drive line assembly comprising the steps of:

(a) providing a backing board;

(b) cutting slots in the board;

(c) adhering a portion of the laminate first surface to the board;

(d) passing further portions of the laminate through the slots; and (e) adhering the laminate second surface of the further portions to the board.

8. The method of claim 7 including the steps of:

(f) folding still further portions of the laminate over the board edges; and (g) adhering the laminate first surface of the still further portions to the board.

9. The method of claim 8 including the following step between steps (c) and (d):

(h) cutting the overlay laminate to provide tabs for passing through the slots and tabs for folding over the board edges.

References Cited

UNITED STATES PATENTS

| | | | |
|---|---|---|---|
| 3,276,000 | 9/1966 | Davis | 340—174 |
| 3,328,781 | 6/1967 | Robey et al. | 340—174 |

JAMES W. MOFFITT, *Primary Examiner.*